US012702919B2

(12) United States Patent
Patterson

(10) Patent No.: US 12,702,919 B2
(45) **Date of Patent: *Aug. 11, 2026**

(54) MULTI-CHALLENGE GAME WITH ACCRUED TIME

(71) Applicant: Alexander Patterson, Brooklyn, NY (US)

(72) Inventor: Alexander Patterson, Brooklyn, NY (US)

(*) Notice: Subject to any disclaimer, the term of this patent is extended or adjusted under 35 U.S.C. 154(b) by 1136 days.

This patent is subject to a terminal disclaimer.

(21) Appl. No.: 17/680,768

(22) Filed: Feb. 25, 2022

(65) Prior Publication Data

US 2022/0176236 A1 Jun. 9, 2022

Related U.S. Application Data

(63) Continuation of application No. 16/708,023, filed on Dec. 9, 2019, now Pat. No. 11,260,285.

(60) Provisional application No. 62/777,746, filed on Dec. 10, 2018.

(51) Int. Cl.

| | |
|---|---|
| ***A63F 9/24*** | (2006.01) |
| ***A63F 9/00*** | (2006.01) |
| ***A63F 9/18*** | (2006.01) |
| ***A63F 13/60*** | (2014.01) |
| ***A63F 13/69*** | (2014.01) |
| ***A63F 13/847*** | (2014.01) |
| ***A63G 33/00*** | (2006.01) |

(52) U.S. Cl.

CPC .................. *A63F 9/24* (2013.01); *A63F 9/18* (2013.01); *A63G 33/00* (2013.01); *A63F 9/0078* (2013.01); *A63F 2009/2457* (2013.01); *A63F 13/60* (2014.09); *A63F 13/69* (2014.09); *A63F 13/847* (2014.09); *A63F 2250/1063* (2013.01); *A63F 2300/8064* (2013.01)

(58) Field of Classification Search

CPC .... A63F 9/24; A63F 9/18; A63F 33/00; A63F 9/0078; A63F 13/60; A63F 13/69; A63F 13/847; A63F 2009/2457; A63F 2250/1063; A63F 2300/8064; A63F 2009/2444; A63F 9/183

USPC .............................................................. 273/1

See application file for complete search history.

(56) References Cited

U.S. PATENT DOCUMENTS

| | | | | |
|---|---|---|---|---|
| 5,762,503 A * | 6/1998 | Hoo | G06Q 10/10 | 434/237 |
| 2009/0034260 A1* | 2/2009 | Ziemkowski | G02B 7/1824 | 359/872 |
| 2018/0345154 A1* | 12/2018 | Thomas | E04H 14/00 | |

* cited by examiner

*Primary Examiner* — Pierre E Elisca

(74) *Attorney, Agent, or Firm* — Rutan & Tucker LLP; Hani Z. Sayed; Marc McClain

(57) ABSTRACT

A method for a game to be played by a team of players including offering the team of players a first challenge, the team of players having the ability to accrue time in the first challenge, and offering the team of players a final challenge, the time allocated for completing the final challenge including at least any time accrued by the team of players in the first challenge.

14 Claims, 7 Drawing Sheets

FIG. 1

Flowchart 10

Challenge 20

Challenge 30

Challenge 40

Challenge 50

Final Challenge 60

MULTI-CHALLENGE GAME WITH ACCRUED TIME

CROSS-REFERENCE TO RELATED APPLICATIONS

This application is a continuation of U.S. patent application Ser. No. 16/708,023, filed Dec. 9, 2019, now issued as U.S. Pat. No. 11,260,285, which claims the benefit of, and hereby incorporates by reference as if expressly set forth herein, U.S. Provisional Patent Application No. 62/777,746, titled Multi-Challenge Game with Accrued Time, to Alexander Patterson et al., filed Dec. 10, 2018.

FIELD OF THE INVENTION

The invention relates to a new game and a method of playing the same. The game involves one or more intermediate challenges during which players can accrue time to complete a final challenge of the game.

BACKGROUND OF THE INVENTION

The multi-challenge game of the present invention is an improvement over known games. Many games are known in the prior art that comprise multiple puzzles. In these games, players generally tend to solve several puzzles in given period of time. These games generally lack excitement because they do not include an overall theme wherein a team of players can accrue time during one or more challenges to complete a final challenge.

SUMMARY OF THE INVENTION

A method for a game including offering a team of players a first challenge, the team of players having the ability to accrue time in the first challenge, and offering the team of players a final challenge, the time allocated for completing the final challenge including at least any time accrued by the team of players in the first challenge.

DESCRIPTION OF THE FIGURES

FIG. 1 shows a flowchart 10 of an embodiment of the game.

DETAILED DESCRIPTION

Figure 1:
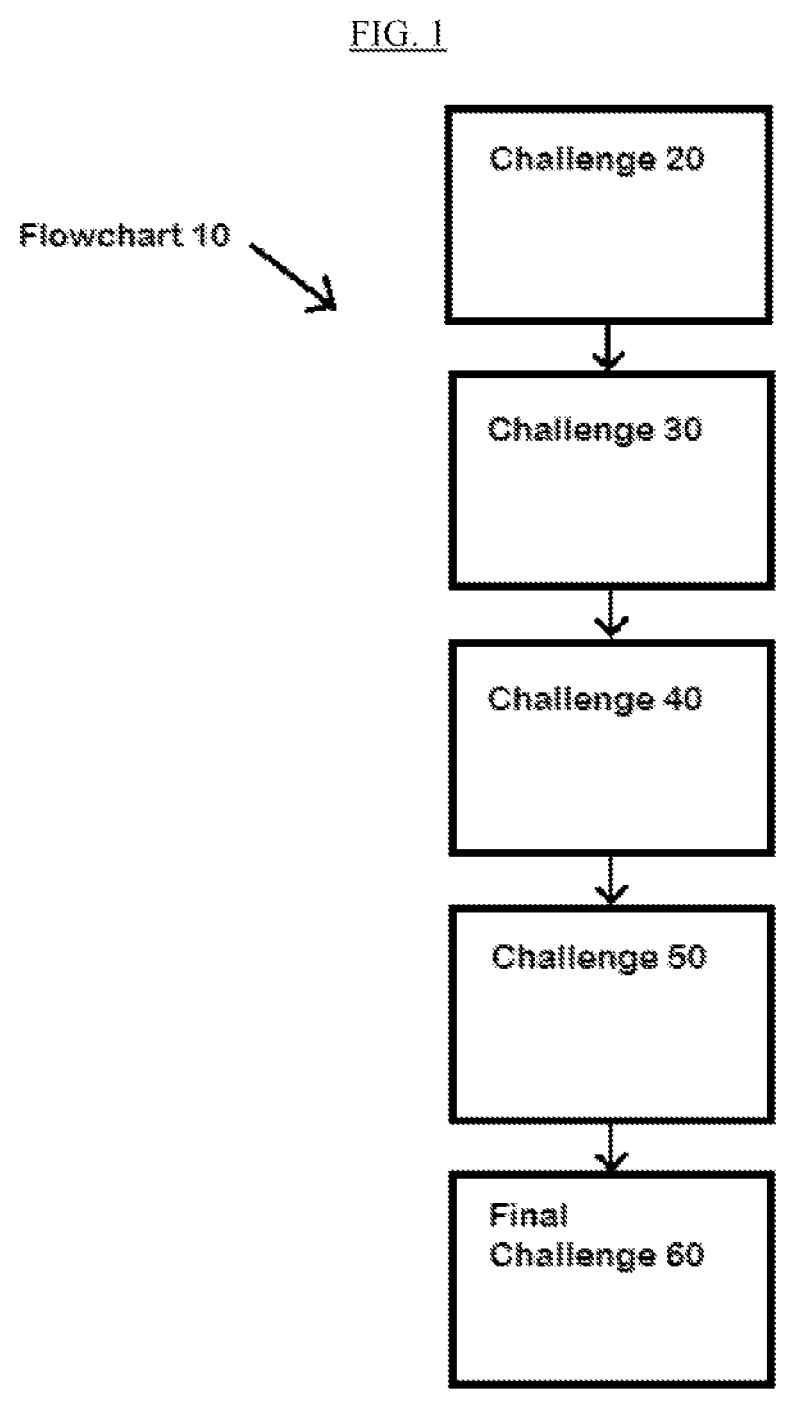
Figure 2:
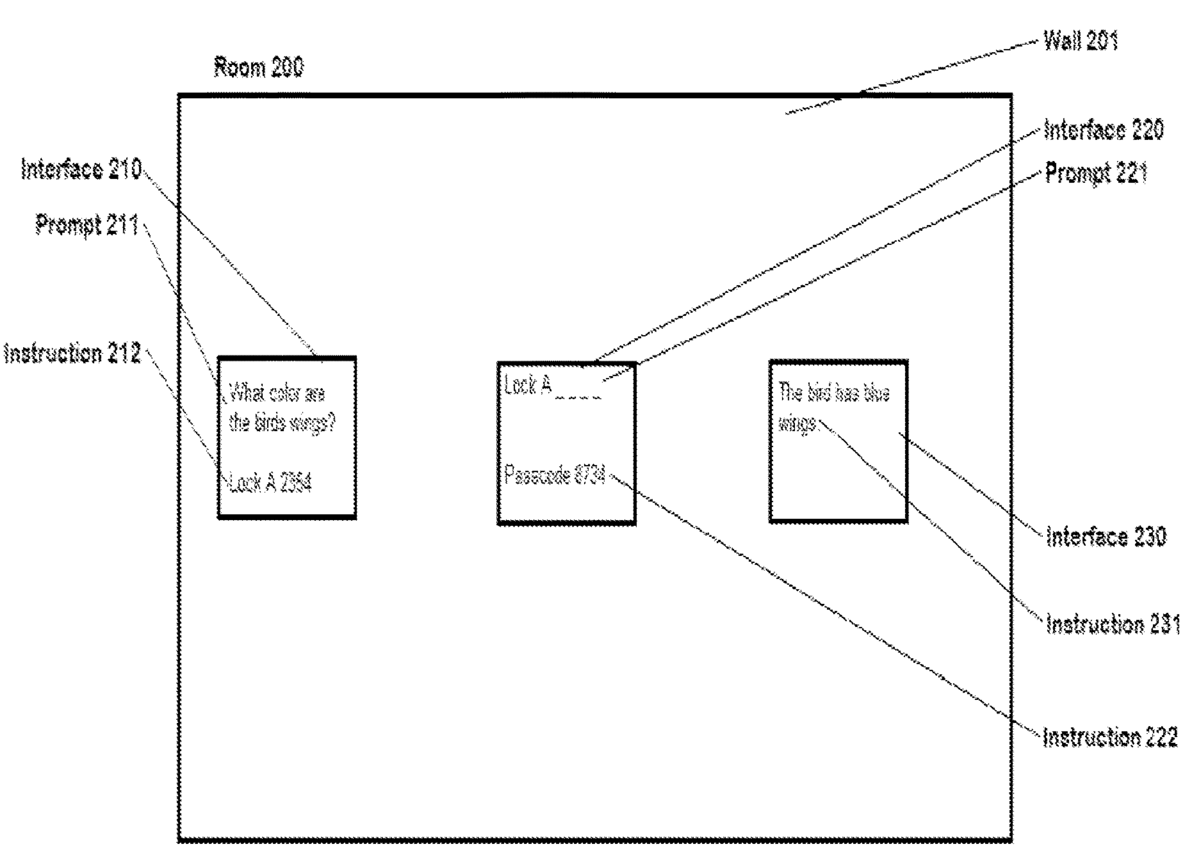
FIG. 2 shows a front view of a room 200 where challenge 20 is played.

FIG. 1 shows a flow chart 10 of an embodiment of the game of the present invention. In this embodiment, the game is played by a team of three players. The game proceeds with the team of players engaging in two or more challenges. In this embodiment, the team of players engage in challenge 20, challenge 30, challenge 40, and challenge 50, and final challenge 60.

The goal of the game is to complete final challenge 60 within the time allocated for that challenge. In this embodiment, the team of players must complete final challenge 60 within the amount of time "accrued" in challenges 20-50. In alternative embodiments, the amount of time given to the team of players to complete final challenge 60 comprises a standard amount of time plus any time "accrued" in challenges 20-50 minus any time "lost" in challenges 20-50. In still further embodiments, time can be accrued as follows: the team of players is given a set amount of time at the beginning of the game and the amount of time subtracted from the set amount of time is based on the team of players' performances in challenges 20-50. Good performance in challenges 20-50 means that less time is subtracted from the set amount of time, meaning that the team of players will have more time to complete final challenge 60. In some embodiments, the amount of time that is "accrued" increases if the team of players selects a high difficulty level or challenges that are difficult. In some embodiments, the challenges that are provided prior to final challenge 60 depend on the performance of the team of players in prior challenges. So, for example, if a team of players performs well on challenge 20, they may be provided with a difficult challenge 30 that is different from a challenge 30 that is presented to a team of players that does not do well on challenge 20. In alternative embodiments, the team of players can select the challenges and/or the difficultly of the challenges before beginning the game.

In this embodiment, each of challenges 20-50 comprises several levels. The team of players accrues time for each level successfully completed beyond a set number of levels in each challenge during the time allocated for that challenge. For example, in this embodiment, the set number of levels for challenge 20 is 10, and the team of players is given 10 minutes to successfully complete as many levels of challenge 20 as they can. Further, the team of players accrues 20 seconds for every level beyond 10 that they complete in challenge 20. Thus, for example, a team of players that completes 14 levels in challenge 20 in 10 minutes will "accrue" 80 seconds. In this embodiment, the team of players is not penalized for failing to complete the set number of levels for challenge 20. However, in alternative embodiments, the team of players may "lose" time if a set number of levels in a challenge is not reached. For example, the team of players may be penalized 10 seconds for each level below 10 that they fail to successfully complete during the 10 minutes allocated for challenge 20. In this embodiment, all of the time "accrued" in challenges 20-50 is combined, and the team of players has that amount of time to complete final challenge 60.

In alternative embodiments, time is "accrued" for every level that is completed. For example, if a team of players completes four levels of a challenge within the time allocated for the challenge and is awarded 10 seconds for every level completed, they will accrue 40 seconds for final challenge 60.

In alternative embodiments, time is "accrued" by completing a level within a set amount of time. For example, the team of players may be given 1 minute to complete level 1 of challenge 20. If the team of players completes level 1 of challenge 20 in 46 seconds, they "accrue" 14 seconds. Similarly, the team of players may be penalized if the team of players completes level 1 in more than a minute. For example, if the team of players completes level 1 of challenge 20 in 64 seconds, they may lose 4 seconds. In alternative embodiments, the team of players does not lose time if they take more than the given amount of time to complete a level. The invention is in no way limited to the challenges or order of the challenges set forth below. Further, the game is not limited to teams of players of 3 players. The game may be played by a team of players of 2 players up to teams of players of 10 or more.

FIG. 2 is a front view of wall 201 of room 200 where the team of players engages in challenge 20. In this embodiment, the team of players is given 10 minutes to complete as many levels as they can in challenge 20. The team of players is awarded 20 seconds for every level above level 10 that is completed in the 10 minutes.

In this embodiment, wall 201 includes interface 210, interface 220, and interface 230. Instructions or information on one or more of the interfaces in room 200 is used to answer questions or prompts on one or more of the other interfaces of room 200. For example, in this embodiment, instruction 231 on interface 230 is the phrase "The bird has blue wings," and the prompt 211 on interface 210 is "What color are the bird's wings?" The level may be successfully completed by inputting into the first interface 210 the answer "blue." Similarly, instruction 212 on interface 210 is "Lock A 2354," and the prompt 221 on interface 220 is "Lock A ______". A second level may be completed by inputting "2354" into second interface 220. Alternatively, a given number of prompts or all of the prompts on the interfaces must be correctly answered to successfully complete a level. The interfaces may also include unnecessary instructions to confuse the team of players. For example, in this embodiment, instruction 222 is "Passcode 8734," but there is no corresponding prompt for the instruction. The interfaces may comprise touch screens, keyboards, or any similar device. In this embodiment, there is no penalty for inputting an incorrect answer. In alternative embodiments, time may be subtracted from the time accrued for inputting an incorrect answer.

During play, instructions and prompts can be simplified and/or the number of instructions and prompts on the interfaces can be reduced to make it easier for the team of players to successfully complete levels. Thus, if a team of players is struggling, challenge 20 can be made easier to ensure that the team of players accrues some time to complete final challenge 60. In alternative embodiments, the team of players can select from different levels of difficulty before the challenge begins or change the level of difficulty of the challenge during play.

In alternative embodiments, the interfaces are spaced apart so as to make it difficult for players in the team of players to see the instructions and prompts of more than one interface at the same time. For example, the interfaces may be placed on different walls and/or surfaces and/or barriers may be used to separate the interfaces. In this way, communication among the players of the team of players is encouraged. In this embodiment, the team of players encounters challenge 20 early in the game to encourage communication among players of the team of players.

In alternative embodiments, one or more interfaces of room 200 allow the team of players to begin the challenge without intervention from persons outside the team of players. One or more displays in room 200 may include a prompt that prompts the team of players to identify themselves to room 200 and begin the challenge. The team of players can then use an interface in room 200 to respond to the prompt. For example, in response to a prompt, the team of players may enter a team name and select "start" to begin the challenge or select options as to how the challenge will be played. For example, the options may include "easy", "medium", and "hard" to indicate a difficulty level of the challenge. In these embodiments, the team of players can begin the challenge when they are ready and need not communicate outside of the team of players. In further alternative embodiments, the team of players may be given an RFID readable component to check into room 200 or challenge 20. In these embodiments, room 200 or challenge 20 will also include an RFID reader. In alternative embodiments, room 200 or challenge 20 may include a thumb or hand scanner or facial recognition devices for the team of players to commence challenge 20. In these embodiments, instructions as to how to play the challenge may be shown on one or more displays in room 200 before the team of players can start the challenge.

Figure 3:
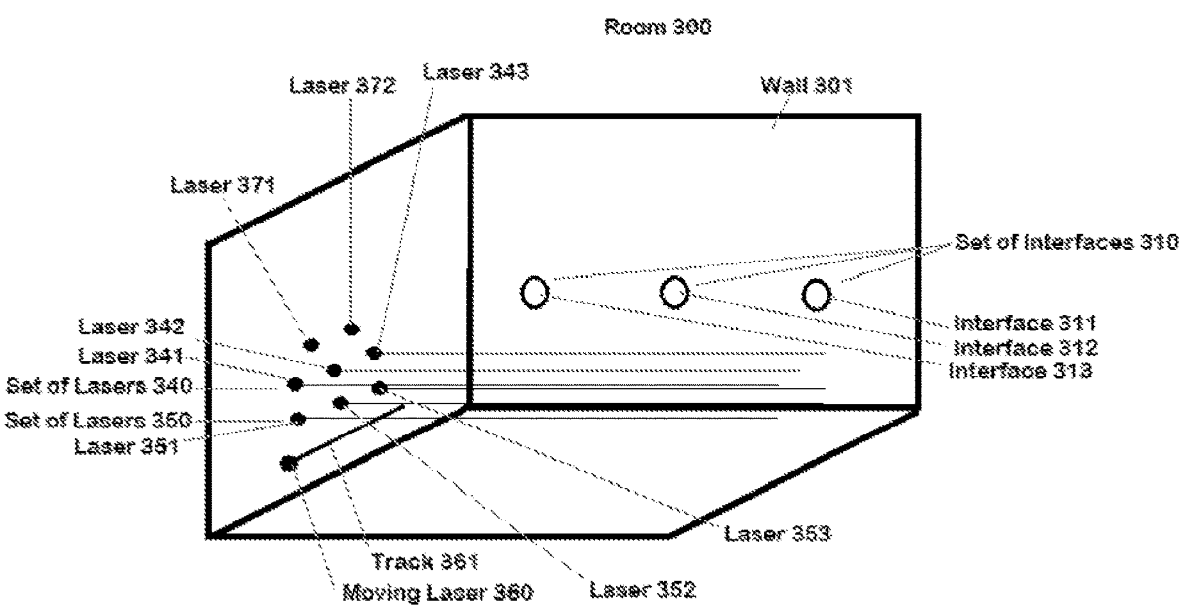
FIG. 3 shows a perspective view of a room 300 where challenge 30 is played.

FIG. 3 is a perspective view of room 300 of the first embodiment used to play challenge 30. FIG. 3 shows a set of interfaces 310 comprising interface 311, interface 312, and interface 313. In this embodiment, the interfaces comprise buttons or touch pads. Room 300 also includes set of lasers 340, comprising laser 341, laser 342, and laser 343, and set of lasers 350, comprising laser 351, laser 352, and laser 353. Room 300 also comprises laser 360 which is designed to be movable along track 361. Room 300 also includes lasers 371 and 372. In this embodiment of level 1 of challenge 30, only the lasers in the set of lasers 340 and the lasers in the set of lasers 350 are activated. Moving laser 360, laser 371, and laser 372 are deactivated.

Figure 4:
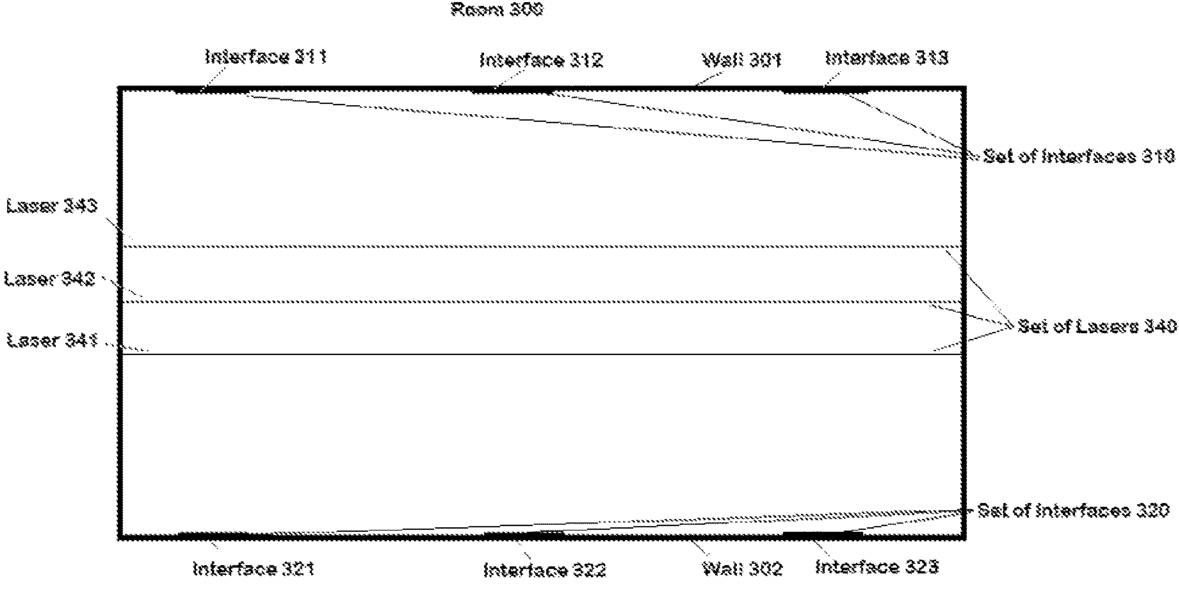
FIG. 4 shows a top view of the room 300.

FIG. 4 is a top view of room 300. This view shows set of interfaces 320 comprising interface 321, interface 322, and interface 323. In this embodiment, interface 321, interface 322, and interface 323 are located directly across the room from interfaces 311, 312, and 313, respectively. In this embodiment, set of interfaces 310 and set of interfaces 320 are located in a line. In alternative embodiments, the set of interfaces need not be in a line. In still alternative embodiments, the interfaces may be arranged in a number of rows or columns.

During play, one or more players of the team of players must traverse room 300 without obstructing an activated laser and activate one or more interfaces. In this embodiment, each of the three players must cross room 300 without obstructing any activated lasers and activate all three interfaces on the opposite wall. For example, if the three players of the team of players were proximate wall 301, they would have to cross room 300 to wall 302 without obstructing any activated lasers and activate interfaces 321, 322, and 323. In this embodiment, interfaces 311, 312, 313, 321, 322, and 323 are spaced so as to prohibit (or make difficult) a single player from using their body to activate more than one sensor at the same time. Further, in this embodiment, all three interfaces on a wall must be activated simultaneously so that all three players must traverse room 300 without obstructing any activated lasers.

In this embodiment, a level is complete upon all three interfaces on a wall being activated simultaneously. In this embodiment, the lasers that are activated and deactivated may change upon completion of a level. For example, upon activation of interfaces 311, 312, and 313 on wall 301, laser 342 and laser 352 may be deactivated and moving laser 360 and laser 371 and laser 372 may be activated. Once activated, moving laser 360 moves back and forth along track 361. Players must then traverse room 300 to wall 302 without obstructing any of the activated lasers and activate interfaces 321, 322, and 323 on wall 302. Similarly, the lasers that are activated and the lasers that are deactivated may change each time all three interfaces on one of the walls is activated for a new level. In this embodiment, the lasers are activated and deactivated in each successive level so that room 300 becomes more difficult to traverse. Further, in some embodiments, the lasers that are activated and deactivated may change during a single level while players are trying to traverse the room. The lasers that are activated and deactivated may change in a predictable manner so that players can anticipate the changes and successfully traverse the room. For example, laser 351 may deactivate for 2 seconds every 4 seconds, laser 352 may deactivate for 1 second every 5 seconds, and laser 353 may deactivate for 6 seconds every 7 seconds. In alternative embodiments, the lasers may be activated and deactivated in an unpredictable manner (or at least unpredictable to the team of players). In still alternative embodiments, additional lasers may be included next to or around set of lasers 340 or set of lasers 350 or on the ceiling of the room 300 or in any other locations. In still further embodiments, the lasers need not be parallel to the walls 301 and 302 or to any surface of room 300. In alternative embodiments, a level can comprise a team of players partially traversing room 300 or a team of players traversing room 300 several times. In still further embodiments, interfaces may be located between wall 301 and 302, and a level is completed when one or more players of the team of players activates that interface. In still further embodiments, the activation and deactivation of lasers can be changed within a level through one or more of the interfaces 311, 312, 313, 321, 322, or 323. For example, interface 311 may blink intermittently or illuminate with a specific color indicating that selecting it will change the activation and deactivation of lasers in room 300. In still alternative embodiments, interfaces 311, 312, 313, 321, 322, and 323 do not indicate which interface must be selected to change the activation and deactivation of lasers in room 300. In some embodiments, where a level includes lasers that are activated and deactivated intermittently, one or more of interfaces 311, 312, 313, 321, 322, or 323 may be used to "freeze" and "play" the activation and deactivation of the lasers.

In this embodiment, all lasers in room 300 are red when activated, and the players must not obstruct activated lasers when crossing room 300. In alternative embodiments, the lasers of room 300 may be different colors, such as red and green. Further, in these embodiments, the rules may require that players traverse room 300 without obstructing red lasers but that green lasers be obstructed during play or within a given time after activation.

In this embodiment, the interfaces to be activated are lit. For example, if three players are proximate wall 301 and must traverse room 300 and activate interfaces 321, 322, and 323, interfaces 321, 322, and 323 glow or are illuminated. In alternative embodiments, additional interfaces can be added to wall 301 and/or wall 302 to accommodate additional players. Where additional interfaces already exist on walls 301 and 302, additional interfaces need simply be illuminated to indicate that they are active during the challenge. Importantly, the number of interfaces on wall 301 and/or wall 302 need not match the number of players in the team of players. In those embodiments, not all players need traverse room 300 and activate interfaces on the opposing wall for the team of players to successfully complete a level. In further alternative embodiments, one or more of set of interfaces 310 and/or set of interfaces 320 need not be spaced so as to disallow or make difficult activation of two or more interfaces by one person at the same time.

In this embodiment, when an activated laser is obstructed by a player traversing room 300, the level is "failed." When a level is failed, all players who have traversed the room must return to the side of room 300 where they were when the level began and again attempt to successfully complete the level. In alternative embodiments, when a level is failed, the players who have not traversed the room move to the other side of the room and again attempt to successfully complete the level. In alternative embodiments, a failed level may result in the team of players being presented with a new level. In this embodiment, there is no penalty when a level is failed. In alternative embodiments, time may be subtracted from the time accrued when a level is failed.

During play, the lasers that are activated and deactivated can be changed to make it easier for the team of players to successfully complete levels. Thus, if a team of players is struggling, challenge 30 can be made easier to ensure that the team of players accrues some time to complete final challenge 60. In alternative embodiments, the players can select from different levels of difficulty before the challenge begins or change the level of difficulty of the challenge during play.

In alternative embodiments, one or more interfaces of room 300 allow the team of players to begin the challenge without intervention from persons outside the team of players. One or more displays in room 300 may include a prompt that prompts the team of players to identify themselves to room 300 and begin the challenge. The team of players can then use an interface in room 300 to respond to the prompt. For example, in response to a prompt, the team of players may enter a team name and select "start" to begin the challenge or select options as to how the challenge will be played. For example, the options may include "easy", "medium", and "hard" to indicate a difficulty level of the challenge. In these embodiments, the team of players can begin the challenge when they are ready and need not communicate outside of the team of players. In further alternative embodiments, the team of players may be given an RFID readable component to check into room 300 or challenge 30. In these embodiments, room 300 or challenge 30 will also include an RFID reader. In alternative embodiments, room 300 or challenge 30 may include a thumb or hand scanner or facial recognition devices for the team of players to commence challenge 20. In these embodiments, instructions as to how to play the challenge may be shown on one or more displays before the team of players can start the challenge.

While the above description indicates that one or more lasers may not be "obstructed" during play, one of ordinary skill in the art would understand that some obstruction may be permitted to allow for: (1) smoke or fog in the room; (2) players to obstruct partially but not completely a laser; or (3) obstruction for a limited amount of time. In alternative embodiments, a set number of total time for obstruction of lasers by the team of players or a set number of obstructions of lasers by the team of players may be permitted without resulting in the level being failed. In alternative embodiments, a computer keeps track of which lasers in room 300 are obstructed by the team of players. In alternative embodiments, additional time may be subtracted from the accrued time where the same laser is obstructed during a level.

Figure 5:
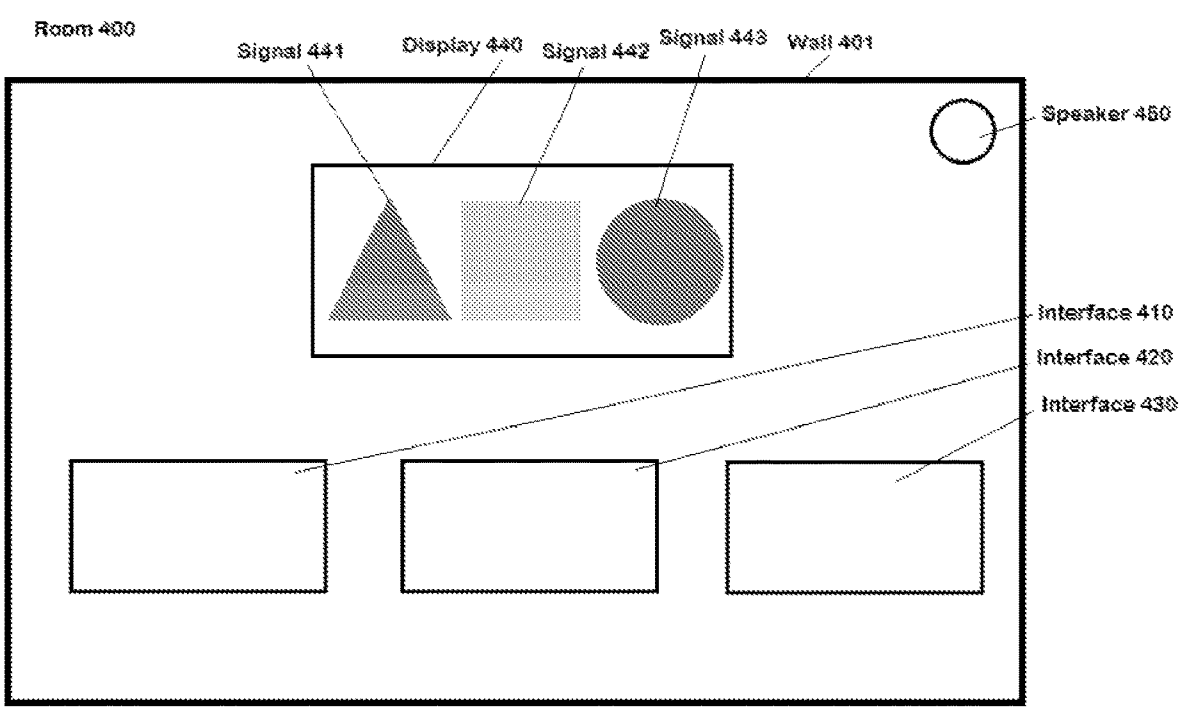
FIG. 5 shows a front view of a room 400 where challenge 40 is played.

FIG. 5 shows interface 410, interface 420, and interface 430 in room 400 used to play challenge 40. In this embodiment, the interfaces comprise buttons, touch screens, or other similar devices. Room 400 also includes a display 440 and a speaker 450.

In this embodiment, during play of a level, a set of signals is displayed on display 440 sequentially. Further, each time a signal is displayed, a unique sound that corresponds to that signal is played over speaker 450. For example, in this level in this embodiment, the display 440 first displays green triangle 441 and speaker 450 plays tone 1. The display 440 then displays yellow square 442 and speaker 450 plays tone 2. The display 440 then displays red circle 443 and the speaker 450 plays tone 3. The set of players must then determine which interface corresponds to which signal and tone. For example, in this level, interface 410 corresponds to red circle 443 and tone 3, interface 420 corresponds to yellow square 442 and tone 2, and interface 430 corresponds to green triangle 441 and tone 1. In this embodiment, the set of players determine which interface corresponds to which speaker and tone by activating the interfaces randomly. The activation of an interface displays the signal on the display 440 and plays the tone on the speaker 450 to which that interface corresponds. The team of players must then play the signals and tones for the level in the correct order from the interfaces 410, 420, and 430 to successfully complete the level. In this embodiment, the interface that corresponds to a signal changes in each level. In alternative embodiments, the interface that corresponds to a signal need not change for every level or need not change at all.

In alternative levels or alternative embodiments, the display 440 may indicate that the set of players it to follow only a characteristic of the signals. For example, the display may indicate that the set of players are to follow only the color of the signals. In those embodiments, the display 440 may display different or incorrect characteristics of a signal with the correct color to be played. In further alternative embodiments or alternative levels, the signals may comprise only black and white shapes or a single color. In even more alternative embodiments, no signal is displayed at all and the set of players may use only tones played over speaker 450 to determine the sequence that needs to be played, which interface corresponds to which tone, and to play the correct sequence from the interfaces. In alternative embodiments, interfaces 410, 420, and 430 may be spaced on different walls or may be located at a table or other location. In this embodiment, there is no penalty when the team of players plays the incorrect signals. In alternative embodiments, time may be subtracted from the time accrued when incorrect signals are played.

In alternative embodiments, there may be more interfaces in room 400 than there are players in the set of players. For example, a team of players with two players may have to play the correct signals from four interfaces in room 400.

In this embodiment, the team of players is not limited to a certain amount of time within the challenge to complete a level. In alternative embodiments, a level is considered failed if the team of players does not complete a level within a certain amount of time. For example, if the team of players has 10 minutes to complete challenge 40, they may be given 1 minute to complete a level of challenge 40 before that level is "failed." In these embodiments, the time to complete a level may be indicated on display 440. Importantly, successful completion of a level need not be limited to the team of players successfully completing all or only the signals displayed on display 440. In alternative embodiments, the team of players can complete a level and accrue time by playing two or more of the signals correctly, even when three or more signals are displayed. In still further embodiments, the team of players can only complete a level and accrue time by playing different sets of signals on display 440.

In this embodiment, interfaces 410, 420, and 430 comprise a single input. In alternative embodiments, interfaces 410, 420, and 430 may comprise multiple inputs. For example, one or more of interfaces 410, 420, and 430 may comprise a green button to "play" the signal to which that interface corresponds and a red button to begin recording of signals for the successful completion of a level.

In alternative embodiments, one or more interfaces of room 400 also allow the team of players to begin the challenge without intervention from persons outside the team of players. One or more displays in room 400 may include a prompt that prompts the team of players to identify themselves to room 400 and begin the challenge. The team of players can then use an interface in room 400 to respond to the prompt. For example, in response to a prompt, the team of players may enter a team name and select "start" to begin the challenge or select options as to how the challenge will be played. For example, the options may include "easy", "medium", and "hard" to indicate a difficulty level of the challenge. In these embodiments, the team of players can begin the challenge when they are ready and need not communicate outside of the team of players. In further alternative embodiments, the team of players may be given an RFID readable component to check into room 400 or challenge 40. In these embodiments, room 400 or challenge 40 will also include an RFID reader. In alternative embodiments, room 400 or challenge 40 may include a thumb or hand scanner or facial recognition devices for the team of players to commence challenge 40. In these embodiments, instructions as to how to play the challenge may be shown on one or more displays before the team of players can start the challenge.

During play, the signals displayed on display 440 can be displayed more slowly or with more characteristics (shape and color) and the tones played over speaker 450 can be made more distinct to make it easier for the team of players to successfully complete levels. Thus, if a team of players is struggling, challenge 40 can be made easier to ensure that the team of players accrues some time to complete final challenge 60. In alternative embodiments, the players can select from different levels of difficulty before the challenge begins or change the level of difficulty of the challenge during play.

Figure 6:
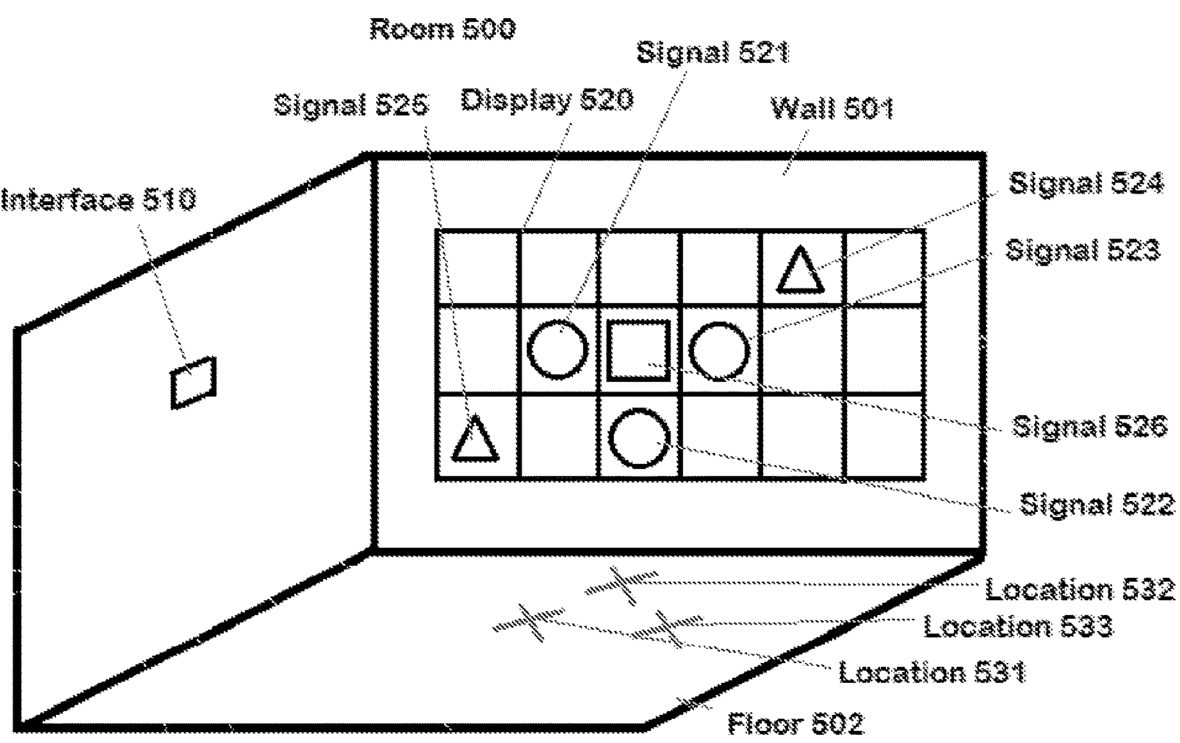
FIG. 6 shows a perspective view of a room 500 where challenge 50 is played.

FIG. 6 shows a room 500 for playing challenge 50. Room 500 includes an interface 510 and a display 520 on wall 501. Interface 510 may comprise a sensor for sensing the location of one or more of the players of the team of players in room 500. In this embodiment, interface 510 is located on a wall of room 500 and senses the location of each of the three players of the team of players. In alternative embodiments, interface 510 is located on a ceiling of room 500 or anywhere inside or outside of room 500 where the location of one or more players of the team of players can be sensed.

In this challenge 50, display 520 displays one or more signals. In this embodiment, display 520 is displaying signal 521, signal 522, signal 523, signal 524, signal 525, and signal 526. Signals 521, 522, and 523 are circles. To complete this level, the players of the team of players must move to the locations on floor 502 that corresponds to the locations of the signals 521, 522, and 523 on display 520. In this FIG. 6, those locations are shown as gray X's at location 531, location 532, and locations 533. However, in play, the location may not be indicated on floor 502. In this embodiment, the corresponding locations on floor 502 are simply the locations on the display 520 as if the display 520 was pulled from the top onto the floor. In alternative embodiments, the corresponding locations on floor 502 may be flipped or inverted compared to the position of the signals 521, 522, and 523 on display 520. A level is successfully completed in challenge 50 when the players of the team of players move to the positions on floor 502 that correspond to the signals 521, 522, and 523 on display 520. In this embodiment, an indication is made on display 520 when a player is at one of location 531, location 532, or location 533. For example, when a player moves to location 531 corresponding signal 521 will change colors or disappear. If the player leaves location 531, signal 521 will return to its original color. Upon successfully completion of a level, as long as time to complete the challenge remains, the team of players is presented with new signals on display 520. Importantly, in alternative embodiments, the successful completion of a level is not limited to where the team of players is located at the locations on floor 502 to which all of the signals 521, 522, and 523 correspond. In these embodiments, a level may be considered complete and time accrued when only a single player from the team of players moves to the appropriate location or when the team of players moves to the locations indicated in several sets of signals on display 520.

In alternative embodiments, two or more of the signals on display 520 may comprise signals that are related and that relationship may be used in the level. For example, the signals may comprise several faces, three of which are the faces of past presidents of the United States and the rest of which are faces of persons other than past presidents of the United States. The display would then indicate that the players of the team of players must move to the locations on floor 502 that correspond to the signals of faces of past presidents of the United States. The level is successfully completed when the players of the team of players move to the correct locations. In still further embodiments, the symbols may comprise numbers. In these embodiments, display 520 may indicate that the players of the team of players must move to the locations on floor 502 that correspond to numbers that add up to a particular number. For example, display 520 may indicate that the players of the team of players have to move to the location on floor 502 that add up to 12. The level is successfully completed when the players of the team of players move to the correct locations. Importantly, in these embodiments, there may be more than one combination of numbers that add up to the set number. For example, display 520 may include signals 1, 2, 3, 4, 5, and 9. In these embodiments, the players of the team of players could successfully complete a level by moving to the locations that correspond to 1, 2, and 9, or alternatively, 3, 4, and 5.

In this embodiment, the players of the team of players must avoid the corresponding locations on floor 502 of signals 524, 525, and 526. If a player moves to one of those positions, the level is failed, and the team of players is presented with new signals on the display 520. In alternative embodiments, moving signals or objects may be displayed on display 520, and the players of the team of players must avoid the locations on the floor 502 that correspond to the position of the moving signals or objects to successfully complete a level. In this embodiment, there is no penalty when a level is failed. In alternative embodiments, time may be subtracted from the time accrued when a level is failed, or alternatively, time may be subtracted when a player fails to avoid a location on floor 502 that corresponds to signals 524, 525, or 526 and the level may continue.

In this embodiment, signals 521, 522, 523, 524, 525, and 526 are displayed on display 520 throughout the level. In alternative embodiments, signals 521, 522, 523, 524, 525, and 526 may be shown only at the beginning of the level or intermittently throughout the level. In still further embodiments, the only signals that are shown on display 520 are the signals that correspond to a location on floor 402 where a player from the team of players is located. In these embodiments, the players must move around floor 402 to determine the signals and positions of the signals on display 520. In still further embodiments, display 520 indicates at the beginning of the challenge or each level the signals that the team of players must move to the corresponding location of. However, during play of the level, the display 520 does not indicate the target signal but only displays the positions of various signals. In these embodiments, the team of players much remember which signal are "good" signals (i.e., can be used to successfully complete a level).

In this embodiment, the individual levels of challenge 50 do not have a time limit, and the team of players have the entire time allocated to challenge 50 to complete one or more levels. In alternative embodiments, the team of players has a set amount of time to complete a level. In these embodiments, if the team of players fails to complete a level within a set amount of time, a new level is presented to the team of players. In some embodiments, the team of players is penalized when a level is failed and time is subtracted from their accrued time.

In still further embodiments, intermittent signals may be displayed on display 520 that allow the team of players to accrue additional time. For example, a "+5" symbol may be displayed on the display 520 for 5 seconds. If a player from the team of players moves to the location that corresponds to that symbol within the 5 second period, the team of players may accrue an additional 5 seconds to complete the final challenge.

In alternative embodiments, one or more interfaces of room 500 also allow the team of players to begin the challenge without intervention from persons outside the team of players. One or more displays in room 500 may include a prompt that prompts the team of players to identify themselves to room 500 and begin the challenge. The team of players can then use an interface in room 500 to respond to the prompt. For example, in response to a prompt, the team of players may enter a team name and select "start" to begin the challenge or select options as to how the challenge will be played. For example, the options may include "easy", "medium", and "hard" to indicate a difficulty level of the challenge. In these embodiments, the team of players can begin the challenge when they are ready and need not communicate outside of the team of players. In further alternative embodiments, the team of players may be given an RFID readable component to check into room 500 or challenge 50. In these embodiments, room 500 or challenge 50 will also include an RFID reader. In alternative embodiments, room 500 or challenge 50 may include a thumb or hand scanner or facial recognition devices for the team of players to commence challenge 50. In these embodiments, instructions as to how to play the challenge may be shown on one or more displays before the team of players can start the challenge.

During play, signals that are meant to be avoided can be reduced or eliminated and/or the relationship between the location of the signals on display 540 and the location of the corresponding locations on floor 502 can be made easier to understand to make it easier for the team of players to successfully complete levels. Thus, if a team of players is struggling, challenge 50 can be made easier to ensure that the team of players accrues some time to complete final challenge 60. In alternative embodiments, the team of players can select from different levels of difficulty before the challenge begins or change the level of difficulty of the challenge during play.

In this embodiment, upon completion of challenges 20-50, the time accrued by the team of players is calculated.

The team of players then has that amount of time to complete final challenge 60. For example, in this embodiment, the team of players may have accrued 80 seconds in challenge 20, 120 seconds in challenge 30, 300 second in challenge 40, and 40 second in challenge 50. Accordingly, the team of players would have 540 seconds to complete final challenge 60.

Figure 7:
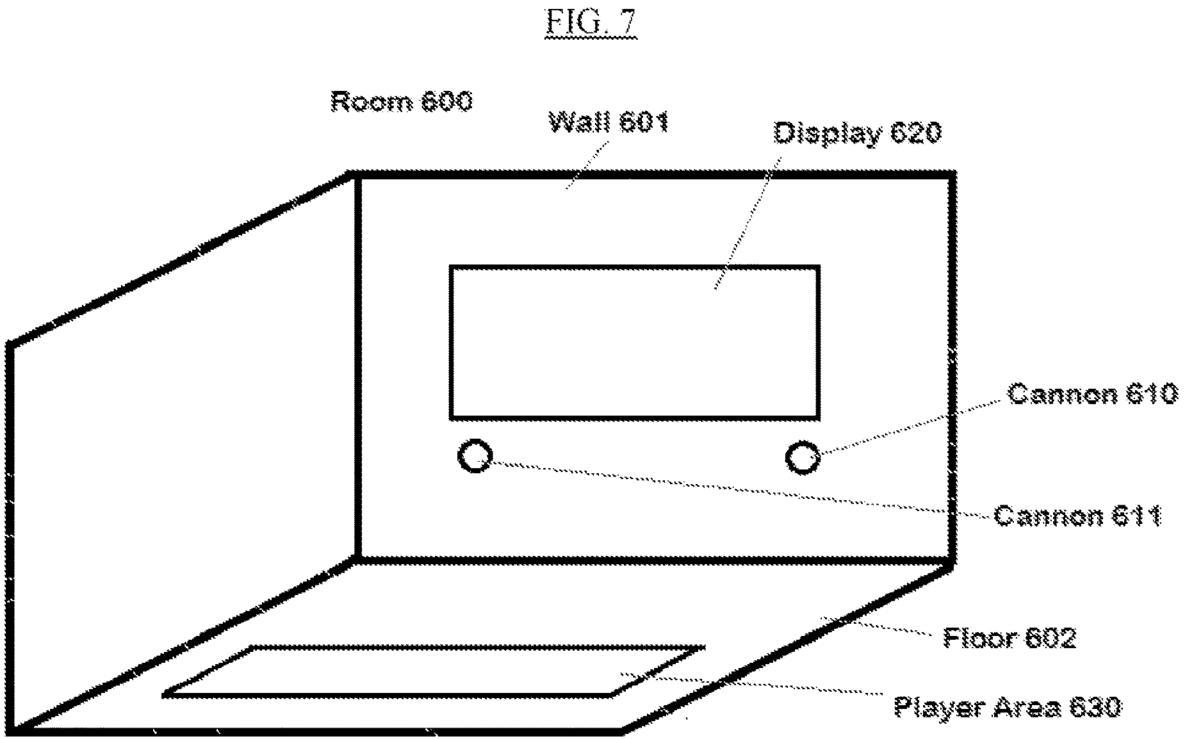
FIG. 7 shows a perspective view of a room 600 where final challenge 60 is played.

FIG. 7 shows a room 600 for playing final challenge 60. In this embodiment, the team of players has the timed accrued in challenges 20-50 to complete final challenge 60. In this embodiment, the team of players receives a final penalty if the final challenge 60 is not completed in the time accrued in challenges 20-50. For example, in this embodiment, room 600 includes paint cannon 610 and paint cannon 611, which dispense paint upon the team of players if they do not finish final challenge 600 within the allocated time. Paint cannons 610 and 611 are configured so as to dispense paint on players standing at player area 630. In this embodiments player area 630 is marked on floor 602 to indicate where the team of players should remain when completing final challenge 60. In alternative embodiments, player area 630 is not indicated on floor 602. Room 600 also includes a display 620 on wall 601. In this embodiment, display 620 is used in final challenge 60. In alternative embodiments, room 600 need not include display 620. Further alternative embodiments include other modes of final penalization. In still alternative embodiments, there is no penalization, and the team of players is simply informed that they have not successfully completed the final challenge. In some embodiments, the final challenge 60 is made more difficult based on the amount of time accrued by the team of players in challenges 20-50.

In alternative embodiments, one or more interfaces of room 600 also allow the team of players to begin the challenge without intervention from persons outside the team of players. One or more displays in room 600 may include a prompt that prompts the team of players to identify themselves to room 600 and begin the challenge. The team of players can then use an interface in room 600 to respond to the prompt. For example, in response to a prompt, the team of players may enter a team name and select "start" to begin the challenge or select options as to how the challenge will be played. For example, the options may include "easy", "medium", and "hard" to indicate a difficulty level of the challenge. In these embodiments, the team of players can begin the challenge when they are ready and need not communicate outside of the team of players. In further alternative embodiments, the team of players may be given an RFID readable component to check into room 600 or final challenge 60. In these embodiments, room 600 or final challenge 60 will also include an RFID reader. In alternative embodiments, room 600 or final challenge 60 may include a thumb or hand scanner or facial recognition devices for the team of players to commence challenge 20. In these embodiments, instructions as to how to play the challenge may be shown on one or more displays before the team of players can start the challenge.

In alternative embodiments, one or more of challenges 20-60 can be played in the same room. In still further alternative embodiments, challenges 20-60 need not be played in a room or rooms at all.

In this embodiment, the accrued time and other team information is shown on a display in each of the rooms 200-600. In alternative embodiments, none of this information is shown in any of the rooms.

While the present disclosure has been presented above with respect to the described and illustrated embodiments of a new game and methods of playing the same, it is to be understood that the disclosure is not to be limited to those alternative and described embodiments and preferred embodiments. Various modifications, which will be apparent to one skilled in the art, fall within the scope of this invention including as described in the attached claims.

The invention claimed is:

1. A system, comprising:
at least one computing device configured to:
determine and provide a sequence of challenges prior to a final challenge to a team of players;
set a completion time for each of the sequence of challenges;
monitor performances of the team of players in each challenge in order to determine an amount of time accrued during the sequence of challenges; and
determine and provide the final challenge to the team of players by at least setting the amount of time accrued during the sequence of challenges for completing the final challenge.

2. The system of claim 1, wherein the amount of time accrued for each challenge is determined by subtracting an actual completion time by the team of players from the completion time set for each challenge.

3. The system of claim 1, wherein the at least one computing device is configured to set multiple difficulty levels for each challenge and set a number of difficulty levels for the team of players to complete within the completion time for each challenge.

4. The system of claim 3, wherein the amount of time accrued by the team of players during each challenge is determined based at least upon each difficulty level successfully completed beyond the number of difficulty levels by the team of players within the completion time for each challenge.

5. The system of claim 3, wherein the amount of time accrued by the team of players during each challenge is determined based at least upon an amount of time awarded for each difficulty level successfully completed by the team of players within the completion time for each challenge.

6. The system of claim 3, wherein the amount of time accrued by the team of players during each challenge is determined based at least upon a selected difficulty level successfully completed by the team of players within the completion time for each challenge.

7. The system of claim 1, wherein the at least one computing device is configured to monitor the performances of the team of players in each challenge by dynamically adjusting a difficulty level of each challenge to ensure the team of players accrues some time to complete the final challenge.

8. The system of claim 1, further comprising one or more interface devices configured to display instructions as to how to play each challenge, questions or prompts to the team of players during each challenge and detect inputs from the team of players during each challenge.

9. The system of claim 8, further comprising radio frequency identification readable components for the team of players.

10. The system of claim 8, further comprising thumb or hand scanners or facial recognition devices for the team of players.

11. The system of claim 8, wherein the one or more interface devices are configured to prompt the team of players to identify themselves prior to each challenge.

12. The system of claim 8, further comprising one or more speakers configured to generate sound corresponding to signals displayed on the one or more interface devices.

13. The system of claim 8, wherein the one or more interface devices comprise at least one sensor configured to obtain location information of one or more of the team of players during at least one of the sequence of challenges.

14. The system of claim 1, further comprising paint cannons configured to dispense paint upon the team of players in response to detecting that the final challenge is not completed within the amount of time accrued during the sequence of challenges.

* * * * *